United States Patent [19]

Wood

[11] Patent Number: 4,679,148
[45] Date of Patent: Jul. 7, 1987

[54] GLASS MACHINE CONTROLLER

[75] Inventor: Charles L. Wood, Muncie, Ind.

[73] Assignee: Ball Corporation, Ind.

[21] Appl. No.: 729,394

[22] Filed: May 1, 1985

[51] Int. Cl.$^4$ .................. C03B 9/40; G06F 15/46
[52] U.S. Cl. .................. 364/473; 364/141; 364/143; 364/900; 65/163
[58] Field of Search .............. 364/140, 141, 143, 146, 364/473, 476, 200 MS File, 900 MS File; 65/158, 163

[56] References Cited

U.S. PATENT DOCUMENTS

| | | | |
|---|---|---|---|
| Re. 29,642 | 5/1978 | Kwiatkowski et al. | 364/900 |
| 1,911,119 | 5/1933 | Ingle . | |
| 3,762,907 | 10/1973 | Quinn et al. | 65/164 |
| 3,812,473 | 5/1974 | Tucker | 364/200 |
| 3,969,703 | 7/1976 | Kwiatkowski et al. | 340/172 |
| 4,021,651 | 5/1977 | Mitsuhashi et al. | 364/900 |
| 4,120,048 | 10/1978 | Fuhrman | 364/200 |
| 4,247,317 | 1/1981 | Wood et al. | 65/29 |
| 4,266,961 | 5/1981 | Wood | 65/29 |
| 4,371,932 | 2/1983 | Dinwiddie, Jr. et al. | 364/200 |
| 4,463,416 | 7/1984 | Wood | 364/143 |
| 4,486,830 | 12/1984 | Taylor, Jr. et al. | 364/141 |
| 4,541,076 | 9/1985 | Bowers et al. | 364/900 |
| 4,561,051 | 12/1985 | Rodman et al. | 364/200 |

OTHER PUBLICATIONS

"Synertek SY2130/SY2131 1024 X 8 Dual Port Random Access Memory", Synertek, Inc., May 1984.

Primary Examiner—Jerry Smith
Assistant Examiner—John R. Lastova
Attorney, Agent, or Firm—Gilbert E. Alberding

[57] ABSTRACT

A glass-forming machine controller permits substantially instantaneous updating of the operating times of the machine components without the complex circuitry required of prior controllers. In the controller, a dual port random access memory (RAM) is provided for storing the on/off statuses of the machine components at each of the increments of time into which each cycle of operation of the machine may be divided. The controller accommodates simultaneous access to the RAM for changing the timing of the machine components and operating the machine components. The memory locations of the RAM may be grouped to provide multiple addressable locations for each increment of time. An address group generator develops sequential address group signals to access each of the multiple addressable memory locations in each increment of time and to obtain the on/off statuses of all of the machine components in each increment of time. The plurality of machine component actuators of each of the plural groups sharing a common activating terminal and with one component actuator in each plural group sharing a common actuating terminal. The number of groups of component actuators are equal to the number of groups of memory locations in the RAM in each increment of time. By connecting the address group generator to the activating terminals of the component actuator array and to the RAM and connecting the data outputs of the RAM to the actuating terminals of the component actuator array, such a controller can effect the operation of a multiplicity of components with a minimal number of components.

4 Claims, 7 Drawing Figures

GROUP 1 COMPONENTS

|   | 9 | 10 | 11 | 12 | 13 | 14 | 15 | 16 |
|---|---|----|----|----|----|----|----|----|
| 0 | 1 | 0  | 1  | 0  | 0  | 0  | 0  | 0  |
| 1 | 1 | 0  | 1  | 0  | 0  | 0  | 0  | 0  |
| 2 | 1 | 0  | 1  | 0  | 0  | 0  | 0  | 0  |
| 3 | 1 | 0  | 0  | 0  | 0  | 0  | 0  | 0  |
| 4 | 1 | 0  | 0  | 0  | 0  | 0  | 0  | 0  |
| 5 | 1 | 0  | 0  | 0  | 0  | 0  | 0  | 0  |
| 6 | 1 | 0  | 0  | 0  | 0  | 0  | 0  |    |
| 7 | 1 | 0  | 0  | 0  | 0  |    |    |    |
| 8 |   |    |    |    |    |    |    |    |

GROUP 3 COMPONENTS

|     | 25 | 26 | 27 | 28 | 29 | 30 | 31 | 32 |
|-----|----|----|----|----|----|----|----|----|
| 511 | 0  | 0  | 0  | 0  | 1  | 0  | 0  | 0  |
| 512 | 0  | 0  | 0  | 0  | 1  | 0  | 0  | 0  |
| 513 | 0  | 0  | 0  | 0  | 1  | 0  | 0  | 0  |
| 514 | 0  | 0  | 0  | 0  | 1  | 0  | 0  | 0  |
| 515 | 1  | 0  | 0  | 0  | 1  | 0  | 0  | 0  |
| 516 | 1  | 0  | 0  | 0  | 1  | 0  | 0  | 0  |
| 517 | 1  | 0  | 0  | 0  | 1  | 0  | 0  | 0  |
| 518 | 1  | 0  | 0  | 0  | 1  | 0  | 0  | 0  |
| 519 | 1  | 0  | 0  | 0  | 1  | 0  | 0  |    |
| 520 | 1  | 0  | 0  | 0  | 1  |    |    |    |
| 521 | 1  | 0  |    |    |    |    |    |    |

FIG. 4

GLASS MACHINE CONTROLLER

This invention relates to a programmable automatic controller for operating glassware-forming machines having a plurality of functional components which operate in time relationship with respect to one another. More specifically this invention relates to a controller that is easily programmed with substantially reduced internal circuitry and logic and permits the control of a multiplicity of components with minimal circuitry and power amplifiers and drivers.

BACKGROUND OF THE INVENTION

Programmable automatic controllers for glassware machines are known. Examples of such prior art controllers using electronic timing circuits are disclosed in U.S. Pat. No. 3,762,907 to Quinn et al. and U.S. Pat. No. 3,969,703 to Kwiatkowski et al., both of which are assigned to the assignee of this application. Such prior art controllers do not include an easily used and simple means for adjusting the time of operation of the various elements in a machine cycle while the machine is operating and, accordingly, lack the flexibility desired in an automatic controller. In addition, a number of prior art controllers, including the two electronic controllers disclosed in the above patents, have storage means in which the component activation/deactivation times are stored in locations which define the operation of particular components. In the operation of these prior art controllers, for each incrementation of cycle time, the incremented time is compared with the contents of at least one location of the storage means. A favorable comparison produces an enable signal, updating the status of an appropriate component control latch circuit and, therefore, the status of the component. The number of electrical components necessary for such controllers is large, and interconnection of the electrical components is complex. A further drawback of prior art controllers is that the adjustment of the timing of operation of various components in the machine cycle is related to actual cycle time. Data can only be entered in the storage means during a fixed period of each cycle in such controllers, resulting in inflexibility of operation and the possibility of delay in updating the data results.

Subsequent controllers have provided a more simplified and efficient means for adjusting the time of actuation of components by means of a controller and have provided an automatic controller in which the data can be updated independent of machine cycle speed. Such automatic controllers have included timing means for generating a digital signal in synchronism with the operation of the machine being controlled, and the digital signal provides an instantaneous indication of the time elapsed in each cycle of operation of the machine. A random access memory stores the operational or on/off status of every component at each increment of time. The statuses are stored at locations identifiable with the machine cycle time to which the stored status relates. The digital signal addresses the RAM so that the statuses of all components for the corresponding times are directed to drivers to produce actuation signals for the various section components. Drivers and interfacing circuitry were required to operate the air solenoids for each of the individual components. Such a machine is disclosed in U.S. Pat. No. 4,247,371 to Wood et al., also assigned to the assignee of this application.

SUMMARY OF THE INVENTION

The controller of this invention permits substantially instantaneous updating of the operating times of the machine components without the complex circuitry required of prior controllers. In the controller of this invention, a dual port random access memory is provided for storing the on/off statuses of the machine components at each of the increments of time into which each cycle of operation of the machine may be divided. Such a random access memory has two separate sets of input ports, allowing independent and substantially simultaneous storage and retrieval of the machine off/on statuses in the memory locations. In the controller of this invention, the dual port random access memory, upon the receipt of signals for simultaneous access to the same address by both the input and output ports, may delay one set of ports until access to the address by the other set of ports is completed. Such delays are so brief in machine time as to be substantially instantaneous and do not affect the operation of the machine.

In the dual port random access memory, sufficient memory locations are provided for storing the on/off statuses of the plural machine components for each increment of time. The memory locations of the random access memory may be grouped to provide multiple addressable locations in the memory for each increment of time. Such controllers may include an address group generator to develop sequential address group signals to access each of the multiple addressable memory locations in each increment of time and to obtain the on/off statuses of all of the machine components in each increment of time.

In such controllers, the plurality of component actuators may be arrayed in plural groups, with the actuators of each of the plural groups sharing a common activating terminal and with one component actuator in each plural group sharing a common actuating terminal. The number of groups of component actuators sharing a common activating terminal equals the number of groups of memory locations for the plural components in the random access memory in each increment of time. By connecting the address group generator to the activating terminals of the component actuator array and to the random access memory and connecting the data outputs of the random access memory to the actuating terminals of the component actuator array, such a controller can effect the operation of a multiplicity of components with a minimal number of semiconductor power circuits for component activation. In such controllers, the component actuator array provides a convenient, inexpensive and reliable interface between the machine controller and the glassware-forming machine.

The controller of the invention permits variations in machine operations to be made substantially simultaneously with the operation of the machine components; it also permits the elimination of substantial component actuator driving circuitry and permits an optically isolated interface between the controller and the machine with only a few optoisolators and power transistors, providing a substantially less expensive and more reliable controller.

Other features and advantages of the present invention are more fully apparent from the following drawings and detailed descriptions of the presently preferred embodiment and claims.

BRIEF DESCRIPTION OF THE DRAWINGS

FIGS. 3 and 3a show a more detailed functional block diagram of the controller of this invention;

FIG. 4 is a schematic representation of the arrangement of data in the random access memory of this invention.

DETAILED DESCRIPTION OF A PREFERRED EMBODIMENT

Figure 1:
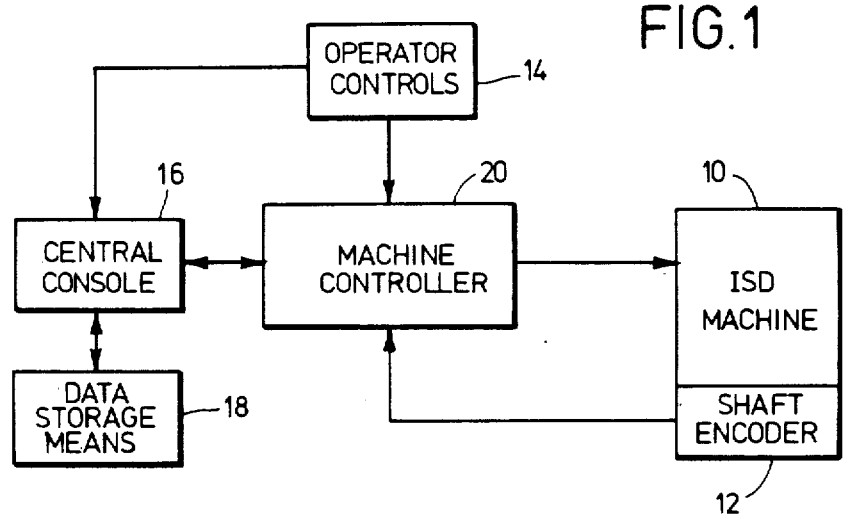
FIG. 1 is a block diagram of a control system for a glass-forming machine.

This invention is intended for use in the operation of glass-forming machines. Glass-forming machines, generally, and individual section glass-forming machines, in particular, are well-known in the art; therefore, no detailed description of the structure or operation of such machines is necessary to the understanding of this invention. Irrespective of the particular type of glass-forming machine with which this invention is used, certain basic components are present; and a brief description of such components, their operation, and their relationship in a blow and blow machine will help gain a clearer perspective of the invention. Such machines are disclosed in greater detail, for example, in U.S. Pat. No. 1,911,119.

Blow and blow glass-forming machines comprise a plurality of sections. Each section is fed with a gob of molten glass in ordered sequence from a single gob feeder. The molten glass is obtained by weighing and mixing its dry ingredients, converting the mixed ingredients to molten glass in a furnace, and delivering the molten glass at the desired temperature to the glass-forming machines. The continuous flow of molten glass is interrupted by a shear which cuts the molten glass into individual gobs for delivery to the several sections of the glass-forming machine in sequence.

In operation of the glass-forming machine, the gobs are carried by a delivery means, including a scoop, a trough, and a deflector, to a funnel positioned over a blank mold to guide the gob into the mold. The severed gob is thus directed through such means and funnelled into the interior of the mold. An element forming a baffle is positioned over the mold and funnel, and compressed air is used to force the molten glass into the neck ring and around the plunger of the mold in a step referred to as settle-blow. The funnel is then removed, and the baffle is seated on top of the blank mold with the plunger retracted. Counterblow air is then introduced into the depression left in the molten glass by the plunger; and the compressed air forces the molten glass to expand and fill the blank, forming a parison.

During this counterblow step, the body of the blank mold extracts heat from the parison sufficiently to form a cool skin which is rigid enough to permit manipulation of the parison by the transfer mechanism which carries the parison to the blow mold section. In a typical machine, a pivotal transfer mechanism removes the parison after the split blank mold has opened and places the parison in the container mold, having inverted the parison in the process so it is now in the upright position and supported by the neck ring and a stop.

The parison is left supported by the closed half of the container mold; and in this position, the heat from the body of the parison reheats the cooler skin of the parison to the point where the parison becomes sufficiently soft for final blowing.

In final formation of the glass container, a blow head is positioned over the blow mold; and blow air is forced into the now-softened parison, causing it to fill and take the shape of the container mold. Once again heat is absorbed by the mold walls from the now-formed thinner-wall, glass container, cooling the glass container sufficiently to render it rigid for handling. The container mold halves are then separated; and the tongs of a take-out mechanism grip the ware at the neck ring, transfer it to a dead plate for complete cooling, and further transfer it to a conveyor.

The timing and the movements of the components of the glass-forming machines in each section are critical, and the movement of each machine component must not only perform its function in the overall process but avoid collisions with other machine components which will interfere with the operation of the machine. For example, if the scoop of a given section fails to retract in time from a position beneath the shears for the glass, the scoops of other sections will be jammed in attempting to acquire the glass gobs. If the blank mold fails to open properly, the next gob will fall on top of the blank and so on. The foregoing examples of operating failures are only a partial listing of the faults that can occur in the operation of an individual section glassware-forming machine if its components are not controlled adequately. Accordingly, the accuracy and facility control is essential to the synchronous operation of the many components of each section of the machine, as well as the timing of gob acquisition and the delivery of finished ware. Of equal importance, the manufacture of satisfactory glassware requires careful timing to control the temperature and plasticity of the glass during formation of the glassware.

It is customary to employ compressed air to provide the motive force for actuating each of the plurality of components of the individual section machine. The controller of this invention is well suited to control the actuation of component actuators, such as pneumatic valves, in the desired sequence and thus operates a corresponding plurality of pneumatic motive devices, such as compressed-air, piston-cylinder assemblies. It should be understood of course that the controller of this invention is not limited to component actuators such as solenoid controlled pneumatic valves and compressed air cylinders, but may be used for the control of electric and hydraulic systems as well.

FIG. 1 shows a typical system for the control of such IS glassware-forming machines. As shown in FIG. 1, a typical section 10 of an IS machine is controlled by a machine controller 20. Typically, the system includes a timing means 12 to indicate increments of the machine cycle time. Such timing means can generate a digital indication of the increments of time elapsed in each cycle of operation of the machine and, for example, can comprise a pulse generator to generate a train of clock pulses and a reset pulse at the completion of the machine cycle. The timing means 12 can include a suitable pulse-generating machine mounted on the drive shaft of glassware-forming machine to generate two pulse trains. The first pulse train provides a clock pulse for every degree of machine rotation; that is, 360 clock pulse intervals per machine cycle. The second clock pulse provides one reset pulse per machine revolution. Thus, in each cycle of machine operation, a reset pulse is generated at the beginning of each machine cycle; and pulses are generated every 1/360th of a machine cycle. The output of such a shaft encoder 12 is coupled to the machine controller 20 to synchronize operation of the machine controller with the IS machine.

Operator controls 14 are conveniently located adjacent the IS machine 10. Such operator controls 14 can include the start and stop controls for the operation of the IS machine 10, a degree display for displaying the on/off times for selected functions and machine components, and means for controlling and changing the relative activation and deactivation times of selected functions and machine components.

The system can also include a central console 16 to permit monitoring and control the machine controller 20 and IS machine 10 from a remote location. Central console 16 may also permit the integration of the IS machine 10 into a larger manufacturing system through machine controller 20. Central console 16 may include a microprocessor or other digital computer to handle the data from the operator controls 14 and machine controller 20 in accomplishing these functions. This system may also include data storage means 18 which can include a computer disk drive system, or other such means of storing data as known in data processing systems.

Central console 16 can be used to read information from the machine controller 20 relating to the successful manufacture of glassware objects and to store such satisfactory operating data in the data storage means 18. Central console 16 can also be used to retrieve such data from the data storage means 18 and place it in the machine controller, as in setting up the IS machine 10 to manufacture glass articles using a program that has proved to be successful in the past. The operator controls 14 may be used at the site of the IS machine to change the program of the machine components and to refine the operation of the IS machine in making glassware.

Figure 2:
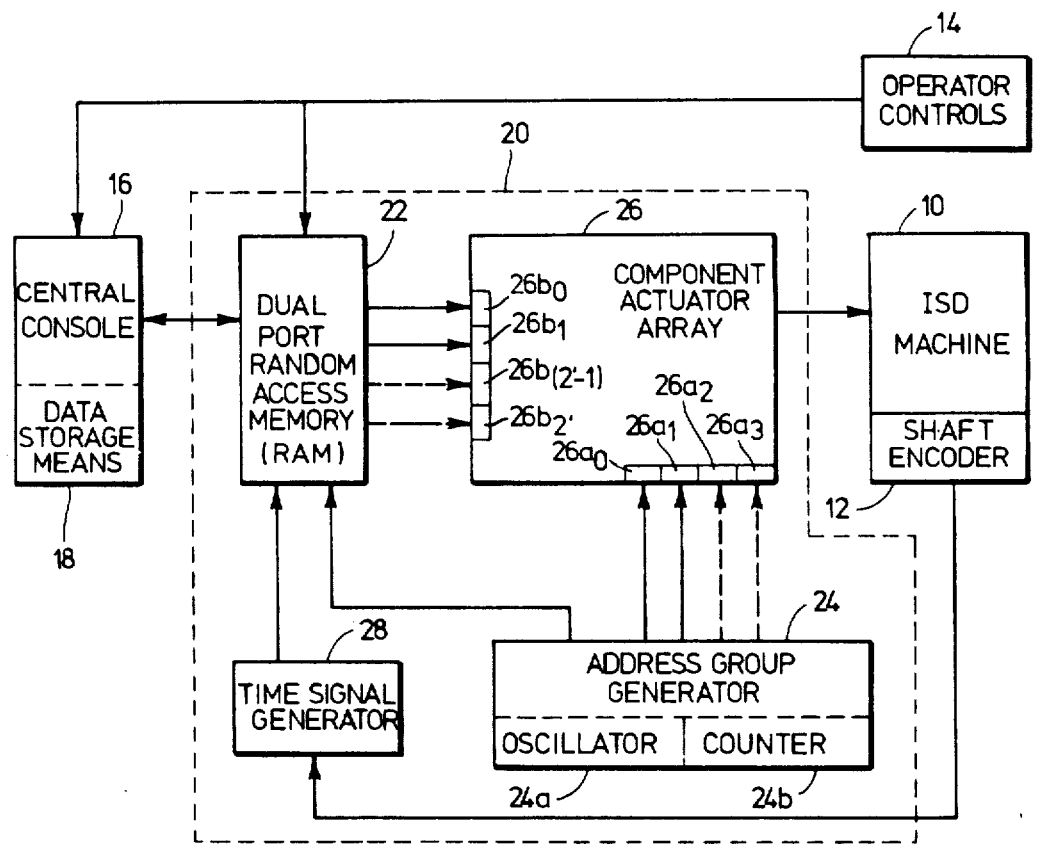
FIG. 2 is a functional block diagram of a system including a controller of this invention.

The controller of this invention is shown in block diagram format in FIG. 2. As shown in FIG. 2, the controller 20 (indicated by dashed line box) includes a dual port random access memory (RAM) 22, an address group generator 24, a component actuator array 26, and a time signal generator 28. The dual port random access memory 22 stores signals corresponding to the on/off statuses of the plurality of components of the IS machine 10 for each of the increments of time in each cycle of operation of the machine. The dual port RAM 22 has two separate sets of input/output ports, allowing independent and substantially simultaneous storage and retrieval of such on/off statuses from the memory locations. The dual port RAM also has two separate sets of address ports to permit simultaneous addressing and access to each of the memory locations in the storage or retrieval of the on/off statuses stored therein. The dual port RAM 22 preferably has sufficient memory locations for storing the on/off statuses of plural components in each increment of time in each cycle of operation of the machine. An example of a dual port random access memory providing these and other advantages is that manufactured by Synertek, Inc., a subsidiary of Honeywell, with offices in Santa Clara, Calif. 95054, under their designations SY2130 and SY2131.

The addressable memory locations of the Synertek dual port random access memories SY2130 and SY2131 are organized for 1024 words of eight bits each; i.e., the Ram has 1024 addressable memory locations and outputs eight bits at each address. In the controller of this invention, each bit location is used to store the on/off status of a machine component in one increment of time. Thus, the on/off statuses of eight machine components may be stored in one of the addressable locations in the RAM. To provide storage for the on/off statuses of a machine component in 360 time increments requires 360 addressable memory locations. This RAM is arranged in the invention to provide storage of the on/off statuses of sixteen machine components throughout the entire machine cycle of 360 time increments (representing a 360° cycle of machine operation) by using two groups of 360 addressable locations in the RAM. For example, addressable locations 0 through 359 would represent degrees 0 through 359 of the machine cycle; and addressable locations 512 through 871 would also represent degrees 0 through 359 of the machine cycle.

FIG. 4 is a pictorial representation of such memory storage. In FIG. 4, the presence of a "1" indicates component actuation and the presence of a "0" indicates that the component is not actuated. The absence of either a "0" or a "1" in FIG. 4 indicates the addressable location is not used. Each vertical column in FIG. 4 represents, through the bits stored therein, the on/off status of a different machine component. The on/off statuses of eight machine components (numbered 9-16) for the 360 degrees of a machine cycle are stored at addressable locations 0 through 359, and the on/off statuses of a different eight machine components (numbered 25-32) for the 360 degrees of a machine cycle are stored at addressable locations 512 through 871. Thus, referring to FIG. 4 at 0°, components 9 and 11 of Group 1 and component 29 of Group 3 would be actuated. Component 11 would continue to be actuated during degrees 1 and 2, as would components 9 and 29, but component 11 would be unactuated during degree 3. In degree 4, the actuation of components 9 and 29 would continue; and component 25 of Group 3 would become actuated. As indicated in FIG. 4, components 9, 25, and 29 would continue their actuation into some later time. In the invention, two SY2130 RAM components are used to provide a RAM with the capability to control up to 32 machine components. The manner in which such a controller operates follows.

An address group generator 24 is provided to provide access to the on/off statuses of all 32 components in each increment of time. In addition, the address group generator, in the controller of this invention, reduces, particularly in conjunction with the component actuator array 26, the components required in the controller 20. The address group generator 24 develops a plurality of sequential address group signals which are used in the controller 20 to identify and provide in sequence at the data outputs of the dual port random access memory the on/off statuses of the plural components of the different groups stored in the random access memory; and the sequential address group signals are further used to identify the corresponding component actuator in the component actuator array 26. In generating the address group signals, the address group generator uses an oscillator 24a and a counter 24b.

Figure 3:
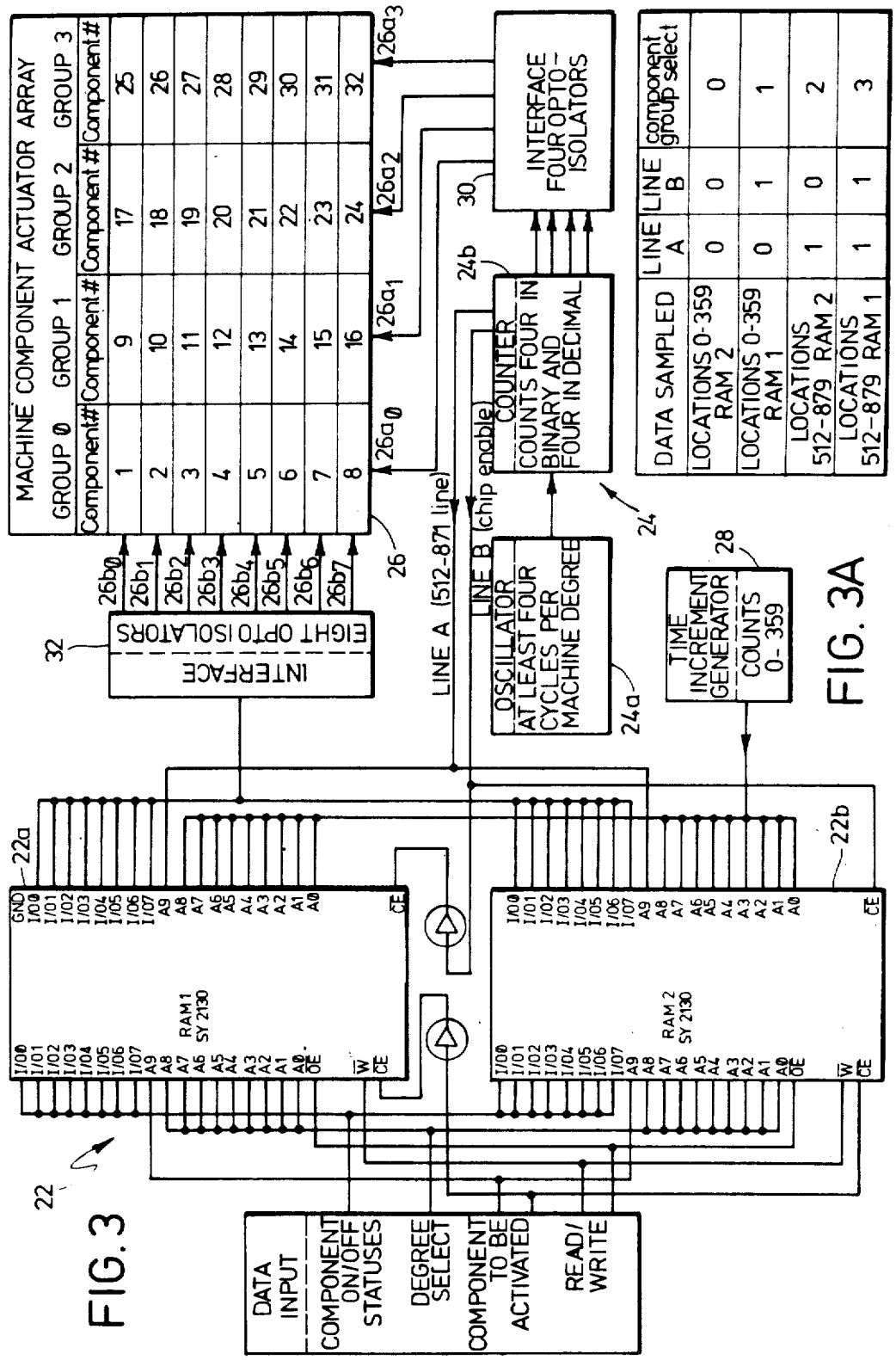

As shown in FIG. 3, the machine component actuator array 26 includes 32 component actuators arranged in four groups of eight component actuators each. The four groups are, for convenience, designated as Group 0, comprising component actuators represented in FIG.

3 by the numerals 1, 2, 3, 4, 5, 6, 7 and 8; Group 1 including the component actuators represented in FIG. 3 by the numerals 9, 10, 11, 12, 13, 14, 15 and 16; Group 2 comprising the component actuators represented by the numerals 17, 18, 19, 20, 21, 22, 23 and 24; and Group 3 including the component actuators represented by the numerals 25, 26, 27, 28, 29, 30, 31, and 32. Component actuators 1 through 8 of Group 0 are all activated by presentation of an activating signal at activating terminal 26a0. Component actuators 9 through 16 of Group 1 are all activated by the presentation of an activating signal at activating terminal 26a1. Component actuators 17 through 24 of Group 2 are all activated by the presentation of an activating signal at activating terminal 26a2. Component actuators 25 through 32 of Group 3 are all activated by the presentation of an activating signal at activating terminal 26a3.

The component actuators in component actuator array 26 are also connected so that one component actuator of each of Groups 0 through Group 3 share a common activating terminal. Thus, component actuators 1, 9, 17 and 25 are all connected to and share activating terminal 26b0. Component actuators 2, 10, 18 and 26 eacn share actuating terminal 26b1. Components 3, 11, 19 and 27 each share actuating terminal 26b2. Components 4, 12, 20 and 28 each share actuating terminal 26b3. Components 5, 13, 21 and 29 each share actuating terminal 26b4. Components 6, 14, 22 and 30 each share actuating terminal 26b5. Components 7, 15, 23 and 31 each share actuating terminal 26b6. Components 8, 16, 24 and 32 each share actuating terminal 26b7.

Figure 5:
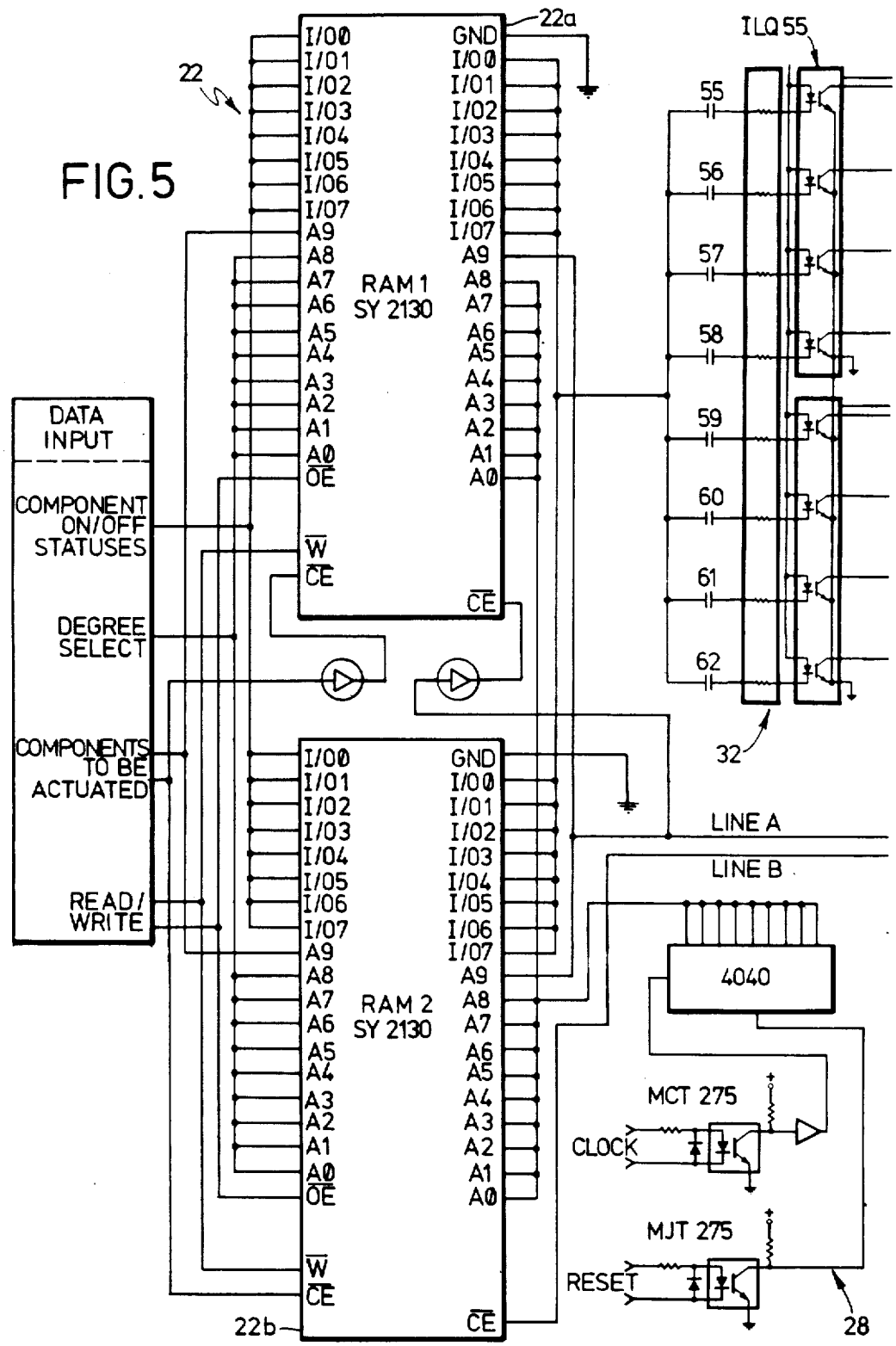
FIG. 5 and 5a are a schematic circuit diagram of a preferred embodiment of the controller of this invention.

As will be apparent from FIG. 5, the presentation of a signal at one of the activating terminals 26a0 through 26a3 and one of the actuating terminals 26b0 through 26b7 will activate the component actuator which is connected to the actuating and activating terminals to which the signals are applied.

In the operation of the system, the address group generator activates in sequence the activating terminals 26a0 through 26a3 of the machine component actuator array. Such activation preferably occurs a plurality of times during each degree, or increment of time, in each cycle of machine operation. The presentation of one of more actuating signals at the actuating terminals 26b0 through 26b7 of the machine component array in the presence of a group-activating signal will result in the actuation of the corresponding components and the operation of their respective functions in the IS machine. For example, with the activation of activating terminal 26a1 and the Group 1 component actuators, the presentation of signals representing "on" statuses at actuating terminals 26b0 and 26b2 will result in the actuation of component actuators 9 and 11 and the performance of the corresponding components and functions of the IS machine. Such operation would correspond to the output of the RAM shown in FIG. 4 for the 0 degree increment of time, and the address group generator would also provide an actuating signal at terminal 26a3 to permit component 29 to be actuated in the 0 degree time increment with the activation of the activating terminal 26a3.

The address group generator also selects in sequence one of four groups of 360 addressable locations in the two dual port RAMS 22a and 22b which correspond with the component group selected and activated in the machine component actuator array 26. Thus, with the activation of Group 0 in array 26 by a signal at activating terminal 26a1, the portion of the RAM memory 22a and 22b storing the on/off statuses of components 1 through 8 for each of the 360° is selected. When the component actuators of Group 1 are activated by the presentation of the signal at actuating terminal 26a1, the portion of the RAM's memory 22a and 22b, which stores the on/off statuses of components 9 through 16 for each of the 360° of operation in the machine cycle is selected. When the component actuators of Group 2 are activated, the portion of the RAM memory 22a and 22b storing the on/off statuses of components 17 through 24 in each of the 360° of machine operation is selected; and when the component actuators of Group 3 are activated by a signal at activating terminal 26a3, the portion of the RAM memory 22a and 22b storing the on/off statuses of components 25 through 32 in each of the 360° machine operation is selected.

As indicated above, the address group generator includes an oscillator 24a and a counter 24b shown in FIG. 3. The table FIG. 3a shows the manner in which address group generator 24 provides the signals to select the groups of component actuators and the corresponding portions of the RAM memory in which the on/off statuses of the component actuators in the selected group are stored. The oscillator 24a of the address group generator, as indicated, generates a signal that is preferably a plurality of times (n) larger than the number of groups of machine component on/off statuses for each increment of time (4), times the number of increments of time (360), divided by the smallest real time (t) consumed in one cycle of operation of the machine, of frequency equals $(n \times 4 \times 360)/t$. Typically, such an oscillator will provide a frequency of about four kilohertz. The signal from the oscillator is directed to the counter 24b which counts zero to three in binary. Specifically, the output of the counter 24b provides a binary signal that may be processed to produce four signals in sequence for activating terminals 26a0 through 26a3 again and again in each degree of machine operation. The output of the counter further provides a binary count of 4 on two lines (line A and line B—see FIG. 3) which are applied to the two components 22a and 22b of the RAM to select the portions of the RAM memory corresponding to the component group activated by the signals at activating terminals 26a0 through 26a3 of the machine actuator array 26.

For example, during the first cycle of oscillation, an activating signal is directed to activating terminal 26a0 from interface 30 at the same time line A and line B are both low; that is, without signals. Line A is connected to address port 9 of both RAM components 22a and 22b. Line B is connected directly to the chip enable port of RAM 2 (22b) and is connected through an inverter to the chip enable port of RAM 1 (22a). When line B is low, RAM 2 is energized, and when line B is high; RAM 1 is energized. In addition, when line A is low, the time increment generator and counter 28 addresses through terminals A0 through A8 of RAM component 22a, and RAM component 22b the first 360 addressable locations in each RAM. When line A is high, and a signal is present at terminal A9 of the address ports of RAM component 22a, and RAM component 22b, the 360 signals from time increment generator and counter 28 addresses locations 512 through 871 of RAM component 22a, and RAM component 22b.

Thus, FIG. 3A indicates the effect of address group signals generated by the address group generator 24. In the first signal of each group of four signals, lines A and B are both low; and function Group 0 is activated through activating terminal 26a0. Because line A is low, the time signal generator addresses address locations 0 through 359 of the enabled component which is 22b, RAM 2. Thus, the on/off statuses of components 1 through 8 may be retrieved from address locations 0 through 359 of RAM 2 and presented at the input/output ports I/O0 through I/O7. The data output or on/off statuses of components 1 through 8 are connected with the machine component array activating terminals 26b0 through 26b7 through interface 32.

In the second signal of the group of four signals, Group 1 is activated through a signal at activating terminal 26a1 of the machine component actuator array 26; and line B is high which enables chip 22a, RAM 1. Since line A remains low, the signal from the time signal generator 28 addresses address locations 0 through 359 of RAM 1. Thus, the on/off statuses of components 9 through 16 are stored in address locations 0 through 359 of RAM 1; and the on/off statuses are presented at the input/output ports I/O0 through I/O7 and are connected through interface 32 through activating terminals 26b0 through 26b7 during the activation of activating terminal 26a1.

In the third signal of the address group generator, Group 2 is operated by the activation of terminal 26a2. Line A is high, and line B returns to low. Thus, RAM 2 is actuated in the presence of the signal at A9 of RAM 2; and the signals from the time signal generator 28 access addressable locations 512 through 871 of RAM 2. The on/off statuses of components 17 through 24 are stored in addressable locations 512 through 871 of RAM 2, are presented at the input/output ports I/O0 through I/O7, and are connected through interface 32 to actuating terminals 26b0 through 26b7 while terminal 26a2 is activated.

Finally, in the fourth signal, the address group signal activates terminal 26a3; and lines A and B are both high. RAM 1 is thus enabled, and the presence of the signal on terminal A9 directs the signals from time signal generator 28 to addressable locations 512 through 871 of RAM 1. Thus, the on/off statuses of components 25 through 32 are stored in addressable locations 512 through 871 of RAM 1, are presented at the input/output ports I/O0 through I/O7, and are connected through interface 32 with actuating terminals 26b0 through 26b7 of the machine component actuator array 26 while terminal 26a3 is activated.

Thus, in each degree in each cycle of operation, the on/off statuses stored in RAM 1 and RAM 2, 22a and 22b, respectively, are sampled and presented to the machine component actuator array 26 to actuate any of the machine components 1 through 32 if the stored status of that component is on at that time. The address group generator sequentially addresses the portions of the RAM in which the on/off statuses of each of the components are stored by means of coded signals at address ports A9 and chip enable ports CE.

The manner of operation of the controller may be further understood by reference to FIG. 4, which is a representation of the addressable locations of RAM 1, 22a. As indicated above, the dual port random access memory of this invention is preferably comprised of components manufactured by Synertek, Inc., their designations SY2130/SY2131. Such random access memory components are organized to store 1024 eight-bit words and include 1024 addressable locations, each containing eight bits. The on/off status of each of eight components may be stored in one of the addressable locations in one of the RAMs; and since each RAM component has 1024 addressable locations, each component may store the on and off statuses of two groups of eight components throughout an entire 360° cycle of machine operation. Two such components thus provide memory storage capability for the control of 32 machine components. As explained above, RAM 1, 22a, stores the on/off statuses of the components of Group 1, components 9 through 16, at addressable locations 0 through 360 and stores the on/off statuses of the components of Group 3, components 25 through 32, at the addressable locations 512 through 871.

As explained above, FIG. 4 is a pictorial representation of such memory storage. In FIG. 4, the presence of a "1" indicates component actuation; and the presence of a "0" indicates that the component is not actuated. The absence of either a 0 or a 1 indicates the addressable location is not used. Thus, referring to FIG. 4 at 0°, components 9 and 11 of Group 1 and component 29 of Group 3 would be actuated. Component 11 would continue to be actuated during degrees 1 and 2, as would components 9 and 29; but component 11 would be unactuated during degree 3. In degree 4, the actuation of components 9 and 29 would continue; and component 25 of Group 3 would become actuated. As indicated in FIG. 4, components 4, 25 and 29 would continue their actuation into some later time.

In the operation of the controller, the "on" status during degree 0 for components 9 and 11 would be effected by the presence of an "on" signal at ports I/O0 and I/O2, which would be connected through interface 32 to actuating terminals 26b0 and 26b2, while activating terminal 26a1 was activated; and component 29 would be activated by the presence of an actuating signal in I/O4 for connection through interface 32 to port 26b4 while activating terminal 26a3 was activated. These signals would be maintained at their respective terminals through degrees 1 and 2; but, as indicated earlier, at degree 4, the signal would be dropped from the I/O2 port of RAM 1 and actuating terminal 26b2 of the machine component array 26 when terminal 26a1 was activated, and a signal would appear at port I/O1 for connection through interface 32 to actuating terminal 26b0 and operation of component 25 during the activation of terminal 26a3. Of course, when terminal 26a3 was activated, the "on" status signal would continue to appear at port I/O3 for connection through interface 32 and actuating terminal 26b3 for operation of component 28.

FIG. 3 also shows the data input 14, 16 of the dual port random access memories 22a and 22b. Data inputs may be simultaneous or substantially simultaneous with access to the data stored in the random access memories for operation of the machine components. Thus, in storing information in the RAMs 1 and 2, 22a and 22b, signals are applied to the output enable pins for the left ports and to the left port read write enable pins of RAM 1, 22a, and RAM 2, 22b, respectively, in sequence. The portions of the RAM 1 and RAM 2 memories into which component off/on statuses are to be stored are selected by activating pins A9 of the left ports and the chip enable pins of the left ports with the same coded signals shown in FIG. 3A to identify the respective portions of the RAM memory into which the component on/off statuses are to be directed. With RAMs 1 and 2 readied to accept data, the component on/off statuses are directed to the left input/output ports, I/O0 through 7, respectively, of RAMs 1 and 2 to correspond to the components to be actuated and are read in for each component and each degree of machine operation while signals corresponding to each degree are directed into left ports A0 through A8 of RAMs 1 and 2. In operation of the controller 20, in the event any addressable location is being changed at the same time it is being accessed and contentions occur, there are two modes of operation to satisfy such contention. In one mode, contention is ignored; and both operations are allowed to proceed. In the other mode, the dual port random access memory 22 arbitrates the contention by delaying one port until the other port's operation is completed. In such operation, a busy flag is sent to the side whose operation is to be delayed; and the busy flag is driven out at speeds which allow the ports processor to preserve its address and data.

As indicated above, the dual port random access memory is preferably a Synertek SY2130 component. The Synertek SY2130 has two separate and independent sets of input/output ports. Each set of ports allows independent access from read or write to any location in the memory. The SY2130 chip features separate left and right chip enable controls ($CE_l$ and $CE_r$). Each chip enable activates its respective port when it grows low and controls automatic power down circuitry that allows the respective side of the device to remain in a stand-by power mode as long as it remains high. When a port is active, it is allowed access to the entire memory array.

Separate read/write enable ports ($R/W_l$ and $R/W_r$) control writing of new data into any location in the RAM from either port. When $R/W_l$ is low, new data is written into the location selected by the left address field. Likewise, when $R/W_r$ is low, new data is written into the location selected by the right address field; however, in the preferred embodiment of this invention, new data is preferably entered from the left address field only. When a port's read/write enable pin is high, data can be read from that port if its respective output enable control pin ($OE_l$ or $OE_r$) is low. When $R/W_l$ is high and $OE_l$ is low, data is read from the location selected by the left address field. When $R/W_r$ is high and $OE_r$ is low, data is read from the location selected by the right address field.

There is one situation where contention can occur. It is when both left and right ports are active and both addresses match. Two modes of operation are provided for this situation: (i) on chip control logic arbitrates the situation; or (ii) contention is ignored and both ports are given access to the memory location. The OE ports control the mode of operation. If CE or CS is low before OE goes low when both addresses match, then on chip logic arbitrates the situation. Priority is given to the port whose CE or CS became valid first; the other port will not be allowed access to the memory until that port's operation is completed. When both ports' CE or CS controls become valid at the same time while their OEs are high, then the left port is given priority. If both CE and CS pins are valid before their respective OE controls and an address change causes an address match while OE is high, then priority is given to the port whose address became valid first. The other port is not allowed access into the memory until that port's operation is completed. If both addresses became valid at the time time and matched and OE is high, then the left port is given priority.

In the other mode, contention is ignored; and one or both ports have access to the memory at all times. This is accomplished by having OE low when contention occurs. That is, the RAM core is accessible from a port, even if the on chip control logic would have delayed its access provided: (a) the port's OE is low when its CE or CS goes low during an address match; or (b) both ports are active when its OE is low when an address changes causes an address match. Therefore, it is possible for both ports to have access to the same memory location at the same time, even if the right ports of both the left and right sets of pins are simultaneously actuated.

The chip will provide busy flags (BUSY L and BUSY R) when a port's access to the memory has been delayed by on chip logic. Such busy flags may be directed to the central console of the system to assist the operator in changing machine operation. However, in most circumstances in the preferable mode of operation, with the oscillators of the address group generator at a large multiple of the minimum operating time increment signals, the contention which can occur in the system is not of any practical significance since in either mode of operation it will be resolved well within the time of activation or deactuation of the machine components.

FIG. 5 is a circuit diagram indicating the components of the controller and their interconnection. As indicated in FIG. 5, the dual port random access memory comprises two SY2130 chips connected as shown in FIG. 5 for operation as described earlier with respect to FIG. 3. The input/output ports I/O0 through I/O7 of both chips are connected to eight optoisolators in the interface 32. THe eight optoisolators are of the type made by the Siemans Company and sold under their designation ILQ 55. The actuating terminals 26b0 through 26b7 of the component actuator array are connected respectively to a plurality of drivers for the component actuators, each of the drivers comprising a 2N 6533 transistor having its emitter connected to ground and its collector connected to VCC. The activating terminals 26a0 through 26a3 of the machine component actuating array 26 are likewise driven by individual drivers comprising 2N 6533 transistors whose collectors are connected in common through a relay contact 50 of relay K1 to the controller power source. The emitters of the 2N 6533 transistors are respectively connected to activating terminals 26a0 through 26a3 and function individually as switches to connect the activating terminals 26a0 through 26a3 to the controller power source during the time terminals 2620 through 2623 are activated by the address group generator 24.

Figure 5A:
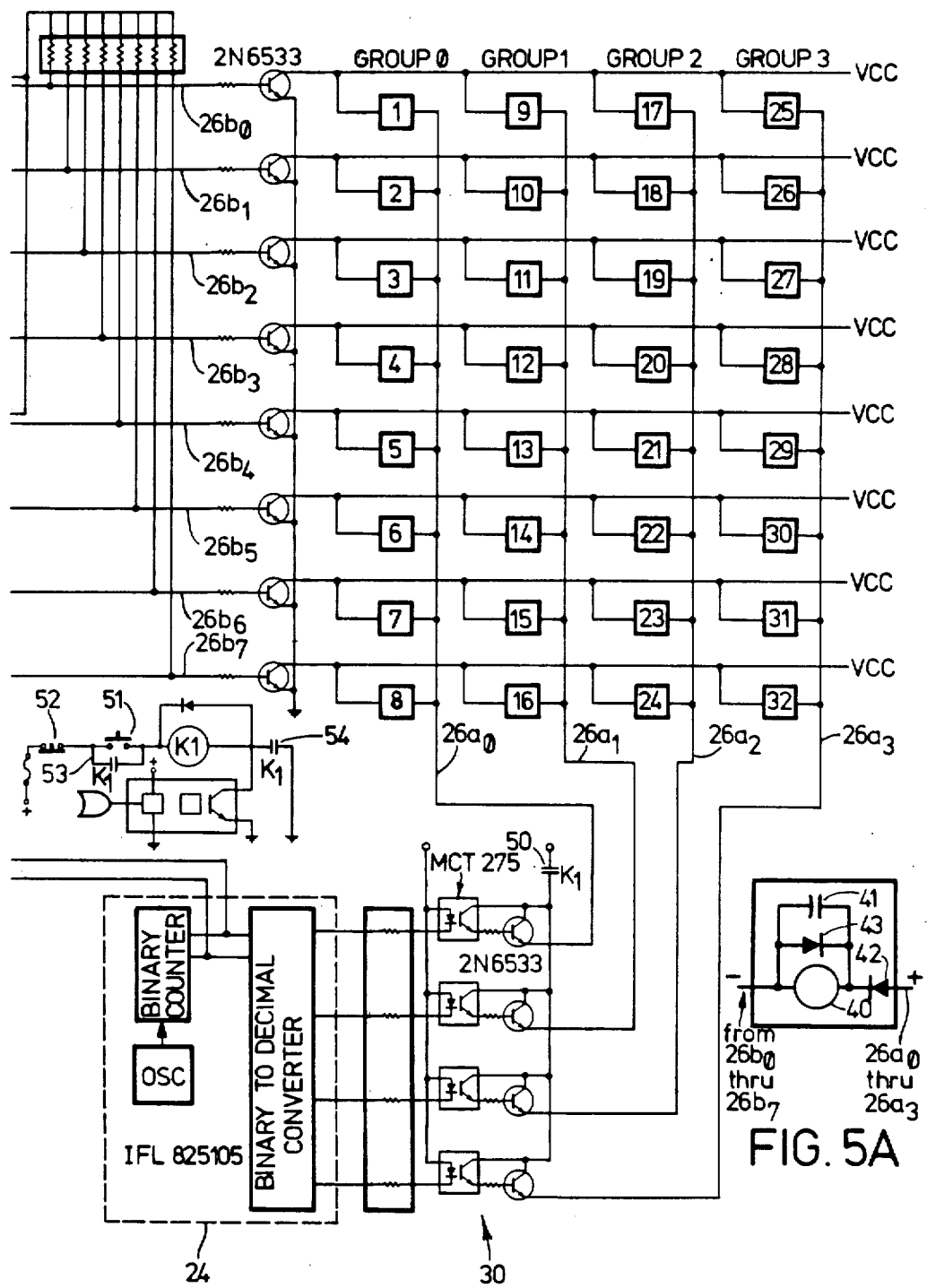

In operation of the components in the machine component array 26, the component actuators are activated by placing power on the activating terminals 26a0 to 26a3 through switching of the 2N 6533 transistors; and the individual components of each group are activated by the presence of an on signal coupled from the data outputs I/O0 through I/O7 of the RAM controllers in the manner described above through the optoisolator interface 30 to drive the respective component drivers (2N 6533 transistors) into saturation, thereby grounding the selected component to be actuated by providing power across its respective coil from the powered activating terminal. FIG. 5A shows the internal circuit of each component actuator. Each component actuator comprises a coil of a solenoid valve 40 connected and parallel with a capacitor 41 and in series with a diode 42. Upon actuation, current from its respective activating terminals 26a0–26a3 to its effectively grounded actuating terminals 26b0 through 26b7 flows through the solenoid 40 and charges the capacitor 41, thus actuating pneumatic or hydraulic valves or relays that may be used to control the machine components. Capacitor 41 is chosen to have a capacitance large enough to maintain actuation of the solenoid coil 40 for a period equal to about one time increment in each cycle of operation (one degree of machine operation). The diode 43 is connected to cross the solenoid coil to dampen any inductive kick upon deactuation to protect the componentry of the circuit.

The address group generator may comprise any oscillator capable of generating a frequency of the type described. The counter of the address group generator is preferably an integrated fused link chip No. 82S105 of the type manufactured by Signetics, Inc., which is programmed to provide a two-bit binary output and four court binary to decimal decoder with inverted outputs. The output of the address group generator is connected through four MCT 275 optoisolators manufactured by General Instrument Corp. The outputs of the optoisolators operate the 2N 6533 transistor drivers at the interface between the address group generator 24 and the activating terminals 26a0 through 26a3 of the machine component actuator array 26.

In the time signal generator, the clock and reset signal are connected to the controller through MCT 275 optoisolators. The clock signal and reset signal are connected with a 4040 counter chip manufactured by Motorola, Inc., to develop a series of digital signals corresponding to 0 to 359 and the degrees of machine operation in each cycle of operation, and a reset signal at the beginning of each cycle of operation. The digital signals from the 4020 counter are connected directly to the right address ports A0 through A8 of RAM 1 and RAM 2.

The controller also includes the start/stop buttons, start/stop switches 51 and 52, and a relay circuitry comprising a relay coil K1 and holding contacts 53 and 54 to hold the controller on. In addition, the circuitry includes a plurality of contacts 50, 55–62 which activate the optoisolators at the interface between the controller circuitry and the machine component actuator array 26, thereby preventing operation of the component actuators inadvertently.

Although only the presently preferred embodiment of this invention has been described in detail, modifications are possible in the described embodiments without materially departing from this invention. All such modifications are included within the scope of this invention as defined by the following claims.

I claim:

1. A programmable automatic controller for controlling at least one section of a glassware-forming machine including a plurality of movable components that operate in timed relationship with respect to one another to form rigid glassware articles from gobs of molten glass, comprising means for generating digital indications of the increments of time elapsed in each cycle of operation of the machine;

a dual port random access memory with sufficient memory locations for storing the on/off statuses of each of the plural machine components in each increment of time in each cycle of operation of the machine, said memory providing grouped memory locations to provide multiple address locations in the memory for each increment of time and having two separate sets of input/output ports allowing independent and substantially simultaneous storage and retrieval for each of the memory locations;

an address group generator to develop a series of sequential address group signals in each increment of time to permit differentiation between the groups of plural components stored in the random access memory during each increment of time;

a plurality of component actuators, said component actuators being connected in plural groups with each plural group sharing a common activating terminal, and with one component actuator in each plural group sharing a common actuating terminal, said activating terminals of each group being connected with the address group generator and said shared actuating terminals of the component actuators being connected with the output ports of the random access memory;

wherein each of the machine components may be efficiently actuated by the on/off status stored in the random access memory in each increment of time.

2. The controller of claim 1 wherein said random access memory, in the event of simultaneous access to the same address by both sets of input/output ports, delays one set of ports until access to the address by the other set of ports is completed.

3. The programmable controller of claim 1 wherein the address group generator is connected with the dual port random access memory to provide in sequence the on/off statuses of the different groups of machine components at the data outputs of the memory, and wherein said address group generator activates the plural groups of component actuators in sequence with the provision of the on/off statuses of the corresponding group of machine components at the data outputs of the memory so that the on/off statuses at the data outputs of the memory actuates the selected component connected with a shared actuating terminal.

4. A programmable automatic controller for controlling at least one section of a glassware-forming machine including a plurality of movable components that operate in timed relationship with respect to one another to form rigid glassware articles from gobs of molten glass, comprising timing means to generate a digital signal indicating increments of time elapsed in each cycle of machine operation;

a dual port random access memory connected with said timing means and having plural address inputs and plural data input/output for storing signals corresponding to the on/off statuses of the plural components for each of the increments of time in each cycle of operation of the machine, the on/off statuses of said plural components being arranged in groups and stored in different portions of the random access memory;

an oscillator to generate a signal at a frequency at least greater than the number of groups (p) of the plural components for which signals are stored in each increment of time in each cycle of operation, times the number of increments of time (n) in each cycle of operation, divided by the smallest increment of time (t) of machine operation anticipated, and a counter connected with the oscillator to generate an address group signal to permit differentiation between the groups of plural components stored in the random access memory during each increment of time and providing at least p sequential address group signals in each increment of time in each cycle of operation;

a plurality of component actuators, said component acuators being connected in p plural groups with each plural group sharing a common activating terminal, and with one component actuator in each of the p plural groups sharing a common actuating terminal, said activating terminals of each group being connected with the address group generator and said shared actuating terminals of the component actuators being connected with the data output terminals of the random access memory;

wherein said random access memory will present the on/off statuses of the plural components in each group of plural components in each increment of time in response to the signal of the timing means and the counter, and specific components may be actuated in response to application of said on/off statuses to the shared actuating terminals of the plurality of component actuators and the application of the sequential address group signal to the group activating terminals.

* * * * *